H. J. M. JOHNSON & A. G. ANDERSON.
FRICTION CLUTCH.
APPLICATION FILED AUG. 17, 1914.
1,161,314.
Patented Nov. 23, 1915.
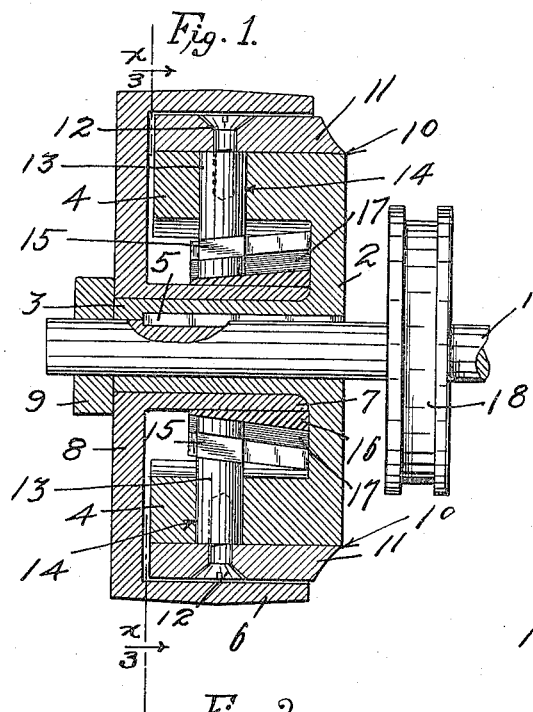
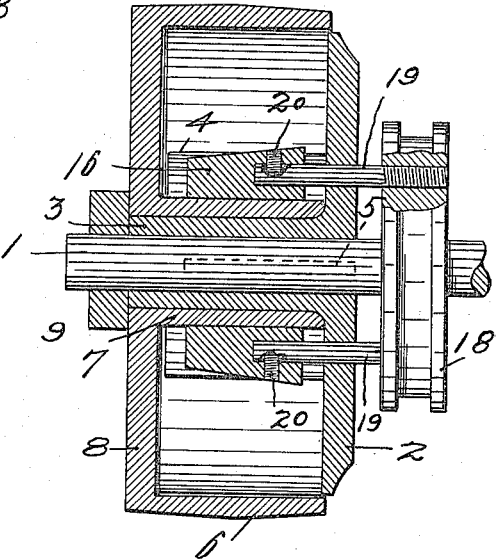
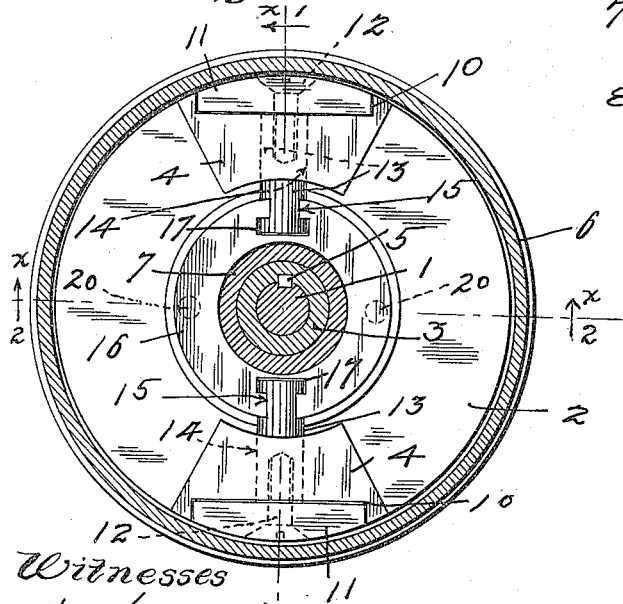
Witnesses
H. D. Kilgore
E. C. Skinkle
Inventors
H. J. M. Johnson
A. G. Anderson
By their Attorneys
Williamson & Merchant

UNITED STATES PATENT OFFICE.

HELGE J. M. JOHNSON AND AXEL G. ANDERSON, OF MINNEAPOLIS, MINNESOTA.

FRICTION-CLUTCH.

1,161,314.　　　　　　　Specification of Letters Patent.　　Patented Nov. 23, 1915.

Application filed August 17, 1914. Serial No. 857,124.

*To all whom it may concern:*

Be it known that we, HELGE J. M. JOHNSON and AXEL G. ANDERSON, citizens of the United States, residing at Minneapolis, in the county of Hennepin and State of Minnesota, have invented certain new and useful Improvements in Friction-Clutches; and we do hereby declare the following to be a full, clear, and exact description of the invention, such as will enable others skilled in the art to which it appertains to make and use the same.

Our invention has for its object to provide an improved friction clutch; and, to this end, it consists of the novel devices and combinations of devices hereinafter described and defined in the claims.

In the accompanying drawings, which illustrate the invention, like characters indicate like parts throughout the several views.

Referring to the drawings, Figure 1 is a view, principally in section, taken on the line $x^1$ $x^1$ of Fig. 3; Fig. 2 is a view, principally in section, taken on the line $x^2$ $x^2$ of Fig. 3; and Fig. 3 is a view in section taken on the line $x^3$ $x^3$ of Fig. 1.

The improved clutch comprises internal and external members, carried by a shaft 1. As shown, the internal member of said clutch comprises a disk or head 2, having an axially projecting sleeve 3 and integrally formed, diametrically opposite, shoe-supporting lugs 4, spaced radially outward from the sleeve 3. The clutch head 2 and sleeve 3 are secured by a key 5 for rotation with the shaft 1. The external clutch member is in the form of a pulley 6, having a hub 7 telescopically and rotatively mounted on the sleeve 3. Said hub 7 is located entirely within the pulley 6 and integrally connected thereto, at one end, by a flange 8. A collar 9, telescoped onto the shaft 1, holds the external clutch member against removal from the sleeve 3, in one direction, and the clutch head 2 holds the same against removal in the other direction.

The outer faces of the lugs 4 are segmental in form, are flush with the periphery of the disk head 2 and are telescoped into the pulley 6. When the clutch members are assembled, the disk head 2 completely closes the open side of said pulley. In the outer face of each lug 4 is a seat 10, adapted to receive and hold a segmental shoe 11 with freedom for radial movement toward and from the shaft 1. On the bottom of each shoe 11 is secured, by a screw 12, a radially projecting stem 13, slidably mounted for endwise movement in a seat 14, formed in the respective lug 4. The inner ends of the stems 13 project completely through the lugs 4 and have cut in the opposite sides thereof grooves 15, which extend obliquely to the axis of the shaft 1.

Telescoped onto the hub 7, with freedom for sliding movement longitudinally thereof, is a head or collar 16, having cut therein a pair of diametrically opposite cam grooves 17, T-shaped in cross section and in which are mounted the grooved inner ends of the stems 13. As best shown in Fig. 1, these cam grooves 17 extend obliquely to the axis of the shaft 1. Obviously, by sliding the collar 16 on the hub 7, the stems 13 are moved radially, inwardly and outwardly, by the cam grooves 17. This radial movement of the stems 13 carries the shoes 11 into and out of frictional contact with the inner face of the pulley 6.

A shipper wheel 18, slidably mounted on the shaft 1, is provided for imparting sliding movement to the collar 16 on the hub 7. This wheel 18 is connected to the collar 16 by a pair of diametrically opposite pins 19. The outer ends of these pins are screwed into the shipper wheel 18 and their inner ends are telescoped into sockets formed in the collar 16 and detachably secured thereto by set screws 20. A shipper lever, not shown, will, in actual usage, be provided for sliding the shipper wheel on the shaft 1.

From the foregoing description in connection with the drawings, it is evident that when the shipper wheel 18 is moved to its extreme outermost position the shoes 11 will be positively held in retracted positions by their stems 13 and the collar 16. When the shipper wheel 18 is moved toward the clutch members the cam grooves 17 will force the stems 13 radially outward and the shoes 11 into frictional engagement with the inner face of the pulley 6. The force with which the shoes 11 engage the pulley 6 depends on the pressure applied to the shipper wheel 18. It is evident that either the shaft 1 or pulley 6 may be used as either the driven or driving member.

The above described friction clutch has no springs or loose parts to get out of order and has, in actual usage, proven highly efficient for the purpose had in view.

What we claim is:

1. The combination with a shaft, of internal and external clutch members, one of which is keyed to the shaft, and the other of which is journaled around the shaft, a shoe-supporting lug on one of the clutch members, a shoe having a stem slidably mounted in said lug, a collar journaled around the shaft, means securing the collar for rotation with the clutch member having a lug, but with freedom for sliding movement with respect thereto, said collar having a cam groove with which the stem of the shoe is interlocked against endwise movement, but permitting free sliding movement of the collar, and means for sliding the collar on the shaft.

2. The combination with a shaft, of an internal clutch member, keyed to said shaft, having a sleeve surrounding said shaft and a pair of diametrically opposite, shoe-supporting lugs, spaced radially outward from said sleeve, an external clutch member comprising a pulley having a hub telescoped onto the sleeve of said internal clutch member, a pair of shoes mounted on said lugs and having stems mounted in said lugs for radial movement with respect to said shaft, a collar slidably mounted on the hub of said external clutch member, having formed therein diametrically opposite cam grooves, extending obliquely with respect to the axis of said shaft, the stems of said shoes having interlocking sliding engagement with said cam grooves, a shipper wheel slidably mounted on said shaft, and a pair of diametrically opposite pins slidably mounted in said internal clutch member and connecting said shipper wheel with said collar, whereby said collar may be moved longitudinally with respect to said shaft for moving said shoes radially into and out of engagement with said external clutch member.

In testimony whereof we affix our signatures in presence of two witnesses.

HELGE J. M. JOHNSON.
AXEL G. ANDERSON.

Witnesses:
  ALICE L. KING,
  HARRY D. KILGORE.

Copies of this patent may be obtained for five cents each, by addressing the "Commissioner of Patents, Washington, D. C."